E. J. WARD.
CORN AND BUNION PLASTER.
APPLICATION FILED MAR. 1, 1910.
958,199.
Patented May 17, 1910.
Fig. 1,
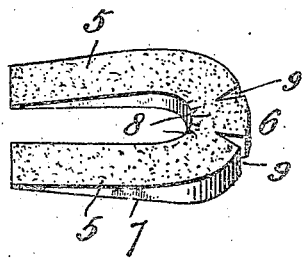
Fig. 2,
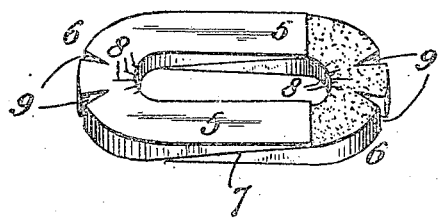
Fig. 3,
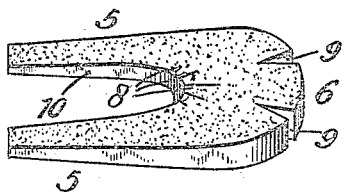
WITNESSES:
J. C. Hartmann
J. F. Sandrews Jr.
INVENTOR
Eugene J. Ward
BY
Chapin & Chapin
his ATTORNEYS

UNITED STATES PATENT OFFICE.

EUGENE J. WARD, OF NEW YORK, N. Y.

CORN AND BUNION PLASTER.

958,199. Specification of Letters Patent. Patented May 17, 1910.

Application filed March 1, 1910. Serial No. 546,644.

*To all whom it may concern:*

Be it known that I, EUGENE J. WARD, a citizen of the United States of America, and a resident of New York, county and State of New York, have invented certain new and useful Improvements in Corn and Bunion Plasters, of which the following is a specification, reference being had to the accompanying drawings, forming a part thereof.

My invention relates to improvements in bunion and corn plasters, and particularly to articles of this description which are adapted to be varied in shape and size to suit different conditions. To this end I provide an open ended structure instead of the continuous annular structure usually employed, and I make certain incisions or cuts at the portion opposite to the open end whereby the free ends may be spread apart as may be desired. I also make the structure tapering in thickness longitudinally so that two of the articles may be placed together to form a continuous structure in use, but as the two members may be adjusted closer together or farther apart, the result is an adjustment as to size of the device as a whole.

In order that my invention may be thoroughly understood, I will now proceed to describe an embodiment thereof, having reference to the accompanying drawings illustrating the same, and will then point out the novel features in claims.

In the drawings: Figure 1 is a view in perspective of a corn plaster constructed in accordance with my invention. Fig. 2 is a view in perspective of two of the elements assembled together showing the same as adapted for use as a large corn plaster, or as a bunion plaster. Fig. 3 shows a modified form of the corn plaster showing the same particularly adapted for the protection of soft corns.

As will be seen by reference to the drawings the device is substantially U-shaped comprising arms 5—5 and a yoke portion 6 connecting them. In thickness the device tapers longitudinally from end to end, the yoke portion 6 having substantial thickness and the extremities of the arms 5—5 being reduced to substantially no thickness at all. The structure as a whole is of felt or similar material such as that ordinarily employed for these articles, the lower surface 7 having an adhesive material applied thereto. The yoke portion 6 is conveniently provided at its inner edge with inwardly projecting incisions 8, and at its outer edge with inwardly extending V-shaped cuts 9. This provision will permit adjustment of the structure within considerable limits, the arms 5—5 being thus permitted to spread apart to a considerable extent. This will permit an adjustment of the device not ordinarily permitted to articles of this character, thus allowing the device to be adjusted in use to meet different conditions.

In Fig. 2 I have shown two of the devices as assembled so as to form a continuous annular form of corn or bunion plaster, and in such case the parts will be adjusted longitudinally closer together or farther apart in accordance with the size desired. The longitudinally tapering form of the article permits the two units to be assembled in this manner without making the central portion of a prohibitive thickness.

In Fig. 3 I have shown a modification in which the upper and lower surfaces are free of adhesive material, and the adhesive material in lieu thereof is applied to the inner edge 10. The yoke portion 6 of this form is also preferably made of considerably greater width. This form is adapted to be applied between the toes, the arms 5—5 extending above and below the foot between the toe joints.

What I claim is:

1. A substantially U-shaped corn plaster having incisions upon the inner edge thereof at points adjacent to the junction of the arms.

2. A U-shaped corn plaster having exterior V-shaped incisions at the outer edges of the yoke portion.

3. A U-shaped corn plaster having incisions upon the inner edge of the yoke portion and V-shaped cuts upon the outer edge thereof.

4. A U-shaped corn plaster having incisions upon the inner edge of the yoke portion and V-shaped cuts upon the outer edge thereof, the said plaster being of reduced thickness from the yoke portion toward the extremity of the arms.

5. A substantially U-shaped corn plaster having incisions at its inner and outer edges for facilitating and permitting lateral adjustment of the arms toward and away from each other.

EUGENE J. WARD.

Witnesses:
D. HOWARD HAYWOOD,
LYMAN S. ANDREWS, Jr.